G. W. SHAWK & A. STORER.

Electro-Magnectic Annunciators.

No. 136,465.  Patented March 4, 1873.

WITNESSES.  
Geo. W. Tibbitts  
Eva Bolton

INVENTORS.  
Geo W Shawk  
Albert Storer

UNITED STATES PATENT OFFICE.

GEORGE W. SHAWK AND ALBERT STORER, OF CLEVELAND, OHIO.

IMPROVEMENT IN ELECTRO-MAGNETIC ANNUNCIATORS.

Specification forming part of Letters Patent No. 136,465, dated March 4, 1873.

*To all whom it may concern:*

Be it known that we, GEORGE W. SHAWK and ALBERT STORER, of Cleveland, in the county of Cuyahoga and State of Ohio, have invented an Improved Annunciator, of which the following is a specification:

The subject of this invention is a machine denominated an annunciator for hotels and other like purposes; and consists in the employment of polarized magnets having numbers attached, in combination with electro-magnets, in such a manner that the polarized permanent magnets shall be released from their connection with the electro-magnets by magnetic repulsion, the circuit of electricity through the electro-magnets being so made as to bring their poles in contact with the same poles of the polarized magnets, whereby they repel, and the polarized magnets (which are permanent magnets) are released, and, by their gravity, fall. These magnets are so arranged in a box that when they fall their number is exposed to view. The electrical current also connects with and actuates other magnets, which, through suitable connections and means, causes a bell or gong to sound. The principle here involved is, that the permanent magnets will, by their magnetic attraction, remain in contact with the soft iron of the electro-magnets while the electrical current remains broken; but when said current is made, the positive and negative poles being opposed to the same poles of the permanent magnets, they repel.

Figure 1:
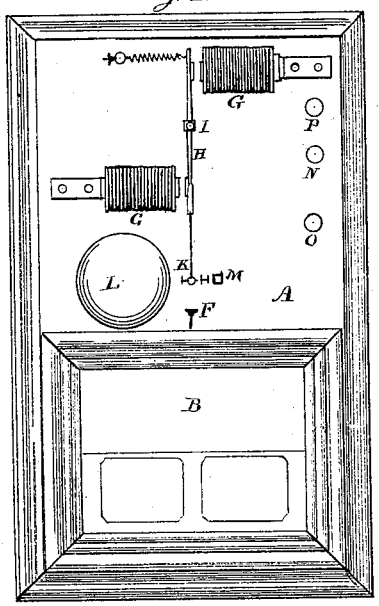
Figure 3:
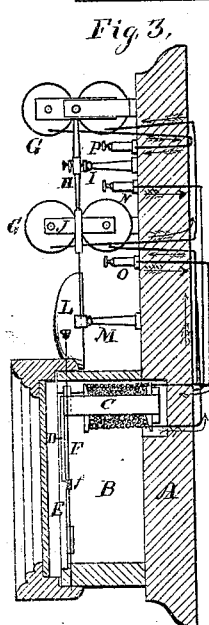
Figure 2:
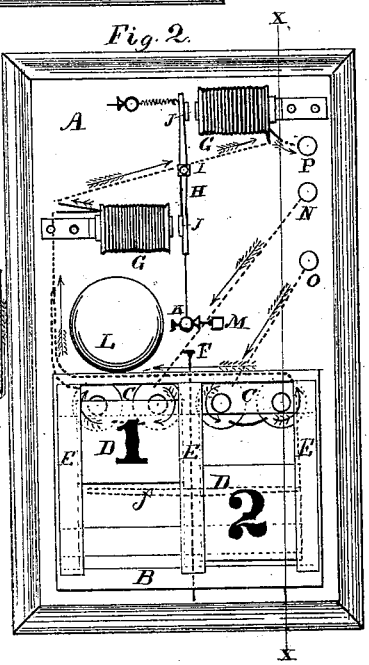

In the accompanying drawing, Figure 1 is a front view of the above-mentioned machine. Fig. 2 is also a front view with the front of the box removed, showing the numbered magnets and the electro-magnets in their relationship, the dotted lines indicating the wires, and the arrows the electrical currents. Fig. 3 is a vertical section in the line $x$ $x$ of Fig. 2.

Like letters of reference indicate like parts.

A is a base-board, on which are arranged the working parts. B is a box placed at the lower side of the said board A, in which are placed the electro-magnets C C. In the front of said box are fixed upright slides E E, in which play plates D D, which plates are permanent magnets, and have attached on their outer surfaces numbers, as represented. The front of the box B contains a glass, partly coated over to make it opaque, but having spaces left uncovered so that the numbers may be seen when the plates D are down. A rod, F, playing in holes made in the cross-bars of the slide-frame, having a horizontal arm, $f$, is used for raising the plates D for placing them again in contact with the electro-magnets after they have fallen. Above the box B, and attached to the base-board A, is placed an electro mechanism for sounding a bell or gong, which consists of two electro-magnets, G G, and a lever, H, pivoted to a post, I, the lever having armatures J J attached. The lower end of said lever has a hammer, K, attached for striking a gong, L, whenever the lever is actuated by the magnets. A spring at the upper end of the lever draws it away from the magnets, and a post, M, at the lower end stops the vibrations of the hammer when the lever flies back. N O P are binding-posts for the wires. The wires leading from the various rooms are attached to the posts N O. The copper side of the battery is attached to the post P.

When the connection is made in a room, which is done by a key, the corresponding numbers in the annunciator fall, and the gong sounds.

All the wires from one side of each of the magnets are collected and return in one wire to the key.

Another feature—a great advantage—is that the magnets D are kept almost constantly in contact with the soft-iron cores of the electro-magnets, which serve as a keeper of magnetism in the said magnets D D. Otherwise they would in time lose their attractive force, and require remagnetizing.

Having thus described our invention, we claim—

1. The polarized magnets D D, when arranged with the electro-magnets C C, or their equivalents, for indicating numbers, substantially as described, and for the purpose set forth.

2. The said polarized magnets D and electro-magnets C, in combination with the electro-magnets G G, lever H, hammer K, and gong L, arranged for sounding a signal, substantially as shown and described, and for the purpose set forth.

GEO. W. SHAWK.
ALBERT STORER.

Witnesses:
GEO. MENGER,
M. GALLAGHER.